US008990841B2

(12) United States Patent
Kim

(10) Patent No.: US 8,990,841 B2
(45) Date of Patent: Mar. 24, 2015

(54) OPTICAL DISC DRIVE

(71) Applicant: Toshiba Samsung Storage Technology Korea Corporation, Suwon-si (KR)

(72) Inventor: Jin Young Kim, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/966,323

(22) Filed: Aug. 14, 2013

(65) Prior Publication Data

US 2014/0053168 A1    Feb. 20, 2014

(30) Foreign Application Priority Data

Aug. 17, 2012  (KR) .......................... 10-2012-0090124

(51) Int. Cl.
*G11B 17/04*     (2006.01)
*G11B 17/056*    (2006.01)

(52) U.S. Cl.
CPC ................................ *G11B 17/056* (2013.01)
USPC ......................................................... 720/613

(58) Field of Classification Search
USPC ......................................................... 720/613
See application file for complete search history.

(56) References Cited

U.S. PATENT DOCUMENTS 7,020,884 B2 * 3/2006  Choi et al. .................... 720/613
7,983,015 B2 * 7/2011  Yang et al. .................... 361/220
2003/0117928 A1 * 6/2003  Choi et al. .................... 369/75.2

FOREIGN PATENT DOCUMENTS

KR    10-2004-0043941    5/2004

OTHER PUBLICATIONS

Korean Office Action issued Sep. 24, 2013 in counterpart Korean Patent Application No. KR10-2012-0090124 (3 pages, in Korean).

* cited by examiner

*Primary Examiner* — Allen T Cao
(74) *Attorney, Agent, or Firm* — NSIP Law

(57) ABSTRACT

Provided is an optical disc drive including a tray disposed in a case of the optical disc drive. The tray includes a guide fixed to the case, and a rail connected with the tray. The guide guides the rail as the tray is moved in and out of the optical disc drive. The rail further includes a supporter that is configured to stably support the rail with respect to the guide to prevent derailment of the rail from the guide.

15 Claims, 6 Drawing Sheets

OPTICAL DISC DRIVE

CROSS-REFERENCE TO RELATED APPLICATION

This application claims the benefit under 35 USC §119(a) of Korean Patent Application No. 10-2012-0090124, filed on Aug. 17, 2012, in the Korean Intellectual Property Office, the entire disclosure of which is incorporated herein by reference for all purposes.

BACKGROUND

1. Field

The following description relates to a tray moving device and an optical disc drive in which the tray moving device is installed, and more particularly, to a structure of a rail that may move a tray along a guide.

2. Description of Related Art

An optical disc drive may be used to store and play audio and video content. Generally, the optical disc drive may move a disc disposed in a disc area of a tray to store data in the disc or to play data stored on the disc. For example, the optical disc drive may use a rail disposed on both sides of the tray to insert the tray into a case of the optical disc drive, or to remove the tray from the case. However, when the optical disc drive is connected to or included in a client terminal such as a personal computer (PC), a laptop computer, and the like, and the client terminal is disturbed or dropped causing an external shock, a derailment may occur. For example, a positional relationship between the tray and the rail may be distorted.

When the tray and the rail are derailed from a guide due to the occurrence of the external shock, the optical disc drive may move the disc disposed on the tray in an abnormal manner, or may not move the disc to be inserted into the case. As a result, the tray and the rail may be shaken and derailed. Thus, the disc inserted through the tray may also be shaken. In such a case, an error may occur when the optical disc drive records data to the disc. Also, the data recorded in the disc may not be played correctly by the optical disc drive due to shaking of the disc.

Accordingly, there is a desire for a device that enables the tray and the rail in the optical disc drive to maintain a determined position without being derailed despite the occurrence of an external shock.

SUMMARY

In an aspect, there is provide an optical disc drive, including a tray disposed in a case of the optical disc drive, a guide fixed to the case and comprising a hole, and a rail comprising a beam type supporter and being connected with the tray, the beam type supporter comprising a top protrusion which is inserted into the hole of the guide to support the rail with respect to the guide.

The beam type supporter may comprise a rectangular pulse shape.

A contact area between the between the beam type supporter and the guide may be provided on a plane.

A side of the beam type supporter may comprise at least one of a stair shape, a curved shape, a saw toothed shape, and a tapered shape indicating a variable slope.

The rail may move the tray through the guide.

The rail may comprise a flattened-U shape to move the tray through the guide.

The guide may comprise one of a flattened-U shape and an L shape.

While the rail is inserted into the guide, a contact portion between an exterior of the rail and an interior of the guide may comprise a round shape edge.

The rail may be disposed on both sides of the tray.

A length of a contact area between the supporter and the guide may be variable.

In an aspect, there is provided an optical disc drive, including a tray disposed in a case of the optical disc drive, a guide fixed to the case and comprising a hole; and a rail comprising a variable slope to support the guide and a supporter including a planar contact area between the supporter and the guide, the supporter comprising a top protrusion which is inserted into the hole of the guide to support the rail with respect to the guide.

The hole may be a contact portion between the rail and the guide and the hole may comprise a round shape.

The rail may be disposed on both sides of the tray.

In an aspect, there is provided a tray moving device to move a tray of an optical disc drive through a guide, the device including a body connected to the tray, and a beam type supporter connected with the body, the beam type supporter comprising a top protrusion which is inserted into a hole of the guide to support the tray moving device with respect to the guide.

The hole may be a contact portion between the tray moving device and the guide and the hole comprises a round shape.

The tray moving device may be disposed on both sides of the tray.

Other features and aspects will be apparent from the following detailed description, the drawings, and the claims.

Figure 1:
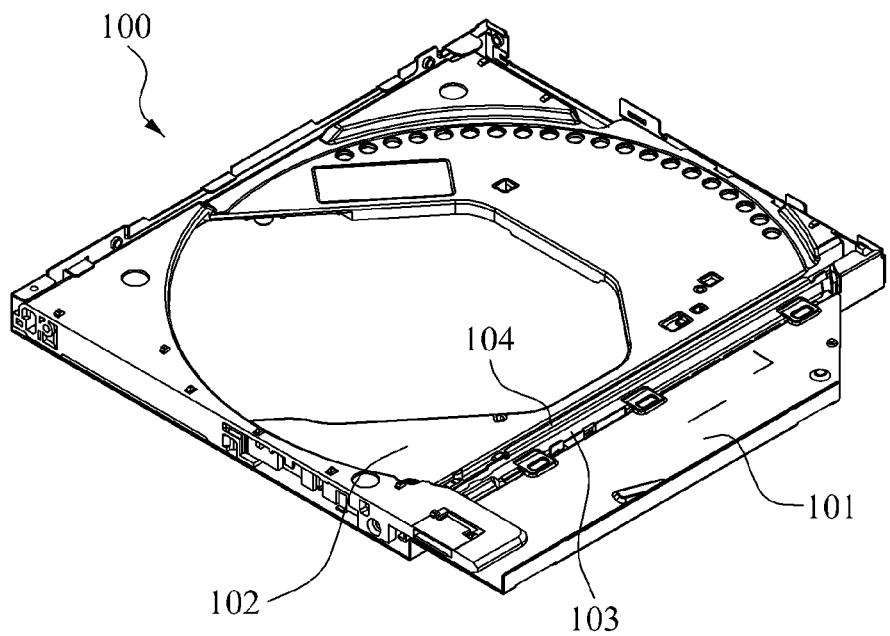
FIG. 1 is a diagram illustrating an example of an optical disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an example of an optical disc drive 100.

Referring to FIG. 1, the optical disc drive 100 includes a tray 102 in the form of a drawer of a case to insert a disc to the case, or remove the disc from the case. Here, the tray 102 may be disposed above a lower case 101. An upper case (not shown) may be connected with the lower case 101 in a form of a cover and may seal the optical disc drive 100. For example, the tray 102 may include a spindle motor (not shown) in which the disc is disposed and an optical pickup device (not shown).

A guide 103 is fixed to the lower case 101 and is disposed in parallel on both sides of the tray 102. The guide 103 may act as a passage enabling a rail 104 to slide and move the tray 102. The rail 104 may be connected with the tray 102 and may support the guide 103. In this example, the rail 104 may be disposed on one or both sides of the tray 102. In addition, the rail 104 may slide along the guide 103 to move the tray 102 in and out of the case.

For example, the guide 103 may be disposed to surround the rail 104. Accordingly, the rail 104 may slide along the guide 103 and be used to move the tray 102 in and out of the case of the optical disc drive 100. When a disc insert button is selected, the rail 104 may slide along the guide 103 to move the tray 102 out of the case of the optical disc drive 100. When the disc is disposed in the tray 102, the rail 104 may slide along the guide 103 to move the tray 102 into the case of the optical disc drive 100.

Similarly, when a disc eject button is selected, the rail 104 may slide along the guide 103 to move the tray 102 out of the case of the optical disc drive 100. When the disc is removed from the tray 102, the rail 104 may slide along the guide 103 to move the tray 102 on which the disc is absent or another disc is disposed into the optical disc drive 100. Accordingly, the guide 103 and the rail 104 may support one another to enable the rail 104 to stably slide, for moving the tray 102.

The optical disc drive 100 may increase a supporting power of the rail 104 with respect to the guide 103 to prevent the tray 102 and the rail 104 from being derailed despite the occurrence of an external shock. Also the optical disc drive 100 may reduce friction between the rail 104 and the guide 103, and may prevent derailment of the rail 104 from the guide 103 by improving a structure of the rail 104.

Figure 2:
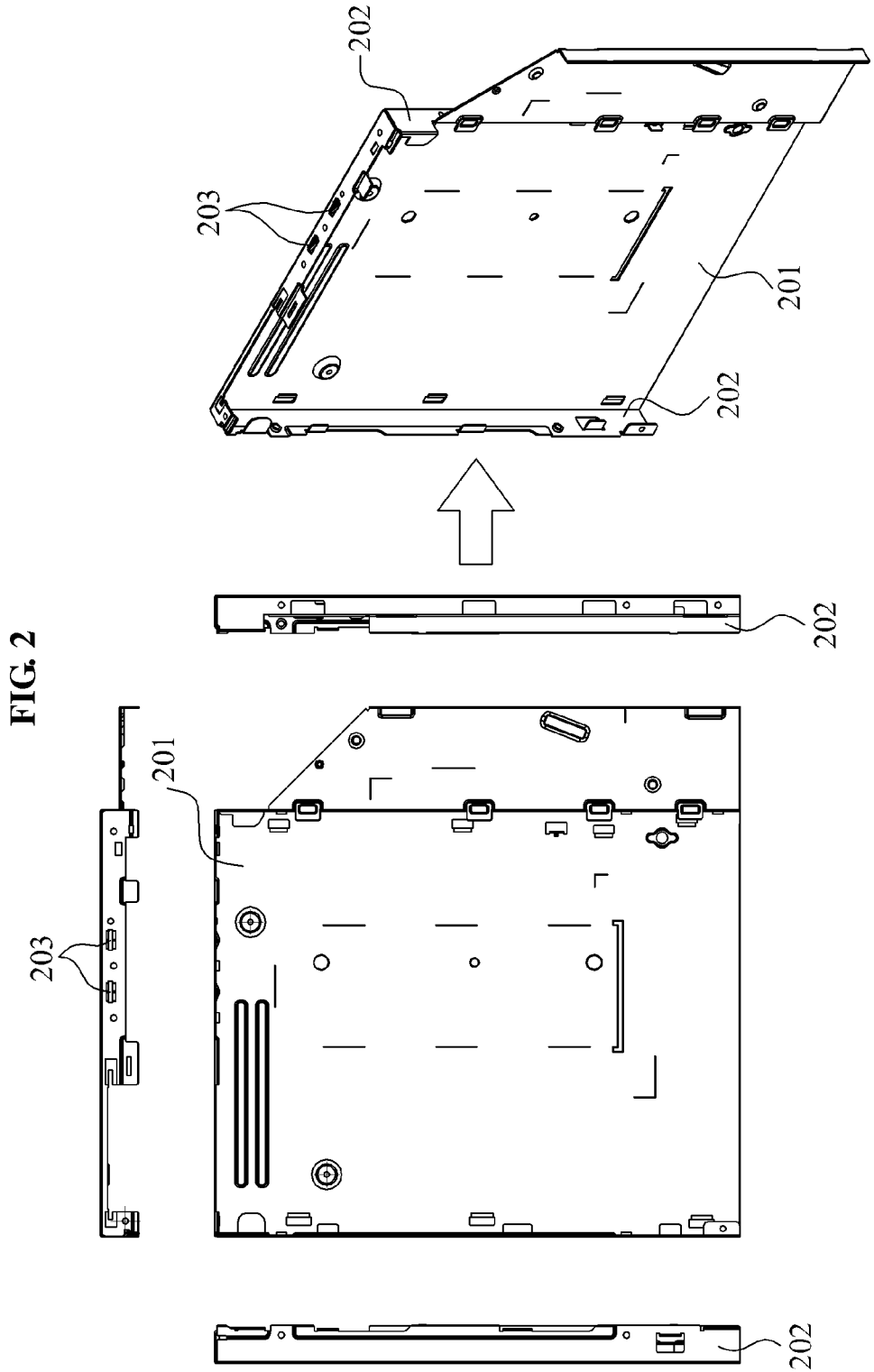
FIG. 2 is a diagram illustrating an example of a lower case and a guide included in an optical disc drive.

FIG. 2 illustrates an example of a lower case 201 and a guide 202 included in an optical disc drive.

Referring to FIG. 2, the guide 202 may be fixed on both sides of the lower case 201. For example, the guide 202 may be provided in a flattened-U shape so that a rail (not shown) may support an upper portion of the guide 202 and a lower portion of the guide 202 fixed to the lower case 201. As another example, the guide 202 may be provided in an L shape.

An interface connector 203 may be used to connect the optical disc drive to a client terminal, for example, a laptop computer, a personal computer (PC), and the like may be disposed on the lower case 201. A tray (not shown) may be disposed above the lower case 201 to be connected with the guide 202.

Figure 3:
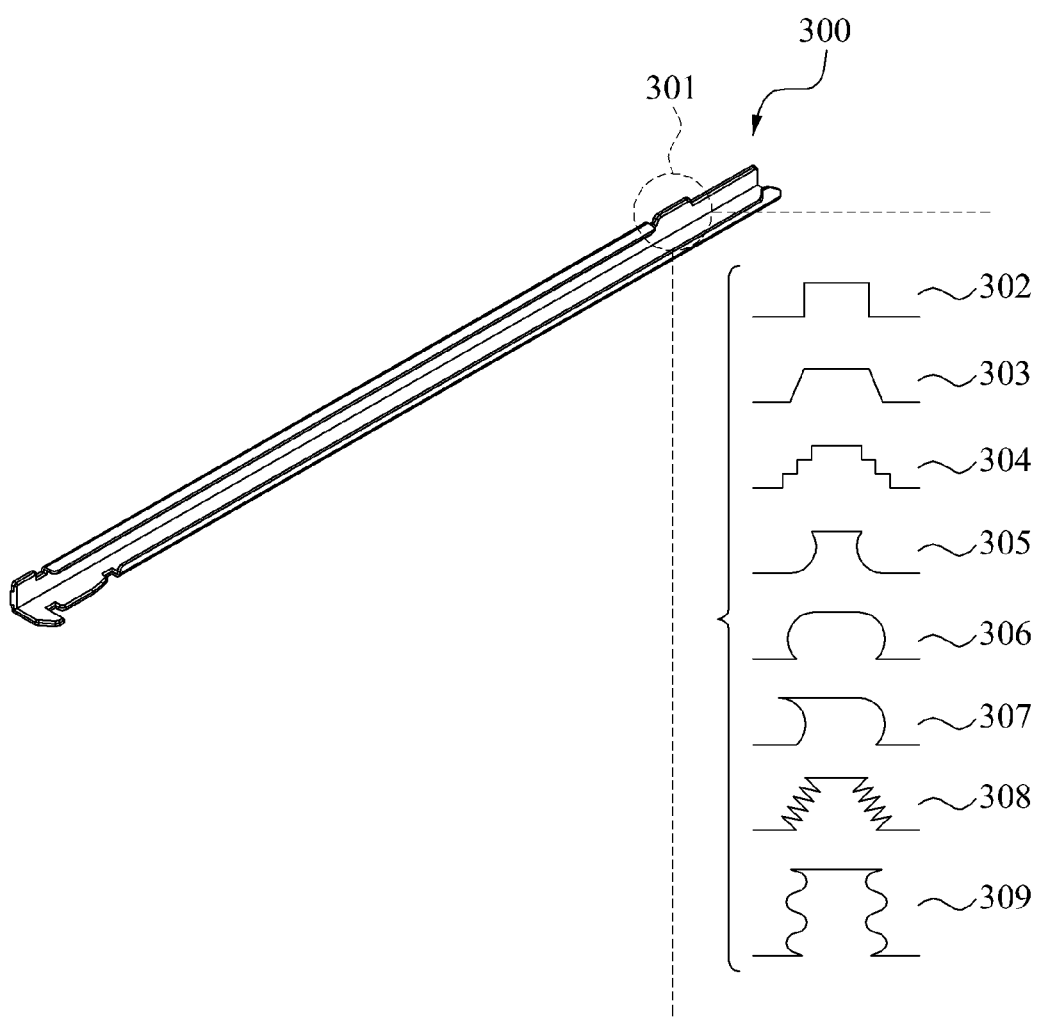
FIG. 3 is a diagram illustrating an example of a beam shape rail disposed in an optical disc drive.

FIG. 3 illustrates an example of a beam shape rail 300 disposed in an optical disc drive. In FIG. 3, the rail 300 may be a tray moving device configured to move a tray (not shown) along a guide (not shown).

Referring to FIG. 3, the rail 300 includes a supporter 301 in a beam shape. Here, the rail 300 connects with the tray and may be used to support the rail with respect to the guide. For example, the rail 300 may be provided in a flattened-U shape to move the tray through the guide.

In this example, the supporter 301 of the rail 300 may be provided in a variety of beam shapes. As shown in an example 302, a contact area between the supporter 301 and the guide is provided on a plane. A length of the contact area between the supporter 301 and the guide may vary. For example, a side of the supporter 301 may be provided in at least one of a stair shape, a curved shape, a saw toothed shape, a tapered shape indicating a variable slope, a rectangular shape, and a wave shape.

As shown in the example, the supporter 301 may be provided in a rectangular pulse shape 302. For example, a plane and a side on which the supporter 301 is in contact with the guide may constitute a right angle.

As another example, the contact area between the supporter 301 and the guide may be provided on a plane, and the side of the supporter 301 may be provided in a tapered shape 303 indicating a variable slope. For example, an angle of the plane and the side on which the supporter 301 is in contact with the guide may be provided in a form of an acute angle or an obtuse angle.

As another example, the contact area between the supporter 301 and the guide may be provided on a plane, and the side of the supporter 301 may be provided in a stair shape 304.

As another example, the side of the supporter 301 may be provided in a curved shape. For example, the side of the supporter 301 may be provided in a concavely curved shape 305. As another example, the side of the supporter 301 may be provided in a convexly curved shape 306. As another example, the side of the supporter may be provided in a shape in which a concave curve and a convex curve are combined 307.

As another example, the side of the supporter 301 may be provided in a saw toothed shape 308. As another example, the side of the supporter 301 may be provided in a wave shape 309.

As yet another example, the side of the supporter 301 may be combined in at least one of a stair shape, a curved shape, a saw toothed shape, a tapered shape indicating a variable slope, a rectangular shape, and a wave shape. When the side of the supporter 301 is provided in a variety of combinations thereof, the contact area between the supporter 301 and the guide may be provided on a plane.

Accordingly, the rail 300 may include the beam type supporter 301 and thus, may increase the supporting power of the rail 300 with respect to the guide. For example, when an external shock occurs to the optical disc device, the beam type supporter 301 may hold the guide to prevent or reduce derailment of the rail 300 and the tray from the guide.

Figure 4:
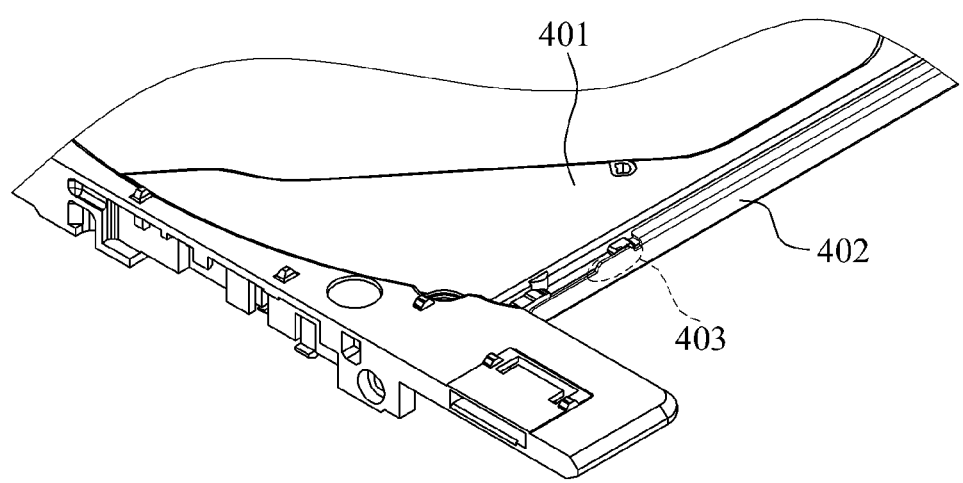
FIG. 4 is a diagram illustrating an example of a rail connected to a tray in an optical disc drive.

FIG. 4 illustrates an example of a rail 402 connected to a tray 401 in an optical disc drive.

Referring to FIG. 4, the rail 402 may be connected to the tray 401 to move the tray 401 along a guide. For example, the rail 402 may have a supporter 403 provided in a beam type. Although the rail 402 is connected to one side of the tray 401 in FIG. 4, in some examples, the rail 402 may be connected to both sides of the tray 401.

For example, at least one of the rails 402 disposed on the both sides of the tray 401 may have the beam type supporter 403. As an example, the rail 402 including the beam type supporter 403 may be disposed on one side of the tray 401, and the rail 402 may be disposed on the other side of the tray 401 without a supporter. As another example, the rails 402 each having the beam type supporter 403 may be disposed on both sides of the tray 401, respectively.

Figure 5:
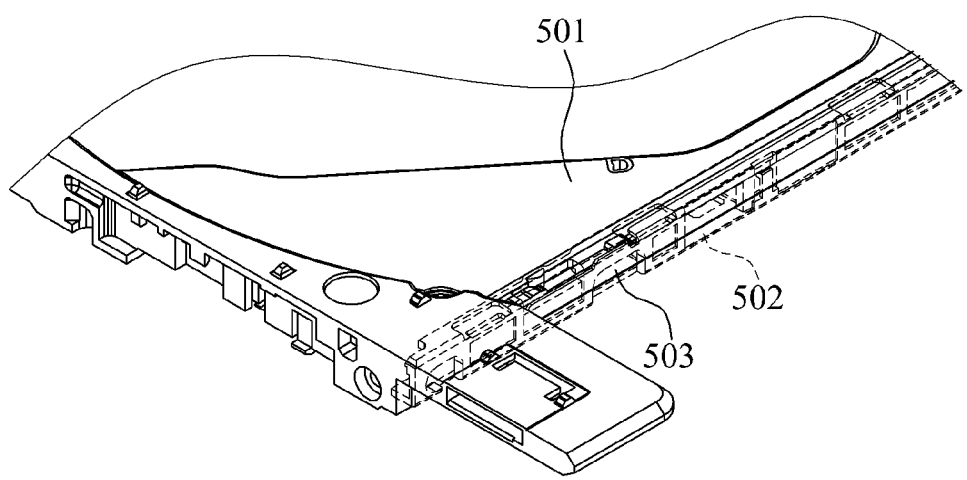
FIG. 5 is a diagram illustrating an example of a rail configured to support a guide in an optical disc drive.

FIG. 5 illustrates an example of a rail 503 configured to slide within a guide 502 in an optical disc drive.

Referring to FIG. 5, the guide 502 may be provided in a flattened-U shape so that the rail 503 contacts an upper portion of the guide 502 and a lower portion of the guide 502. Here, the lower portion of the guide 502 may be fixed to a lower case (not shown). Also, the guide 502 may be provided in an L shape.

In this instance, the guide 502 provided in a flattened-U shape or an L shape may be fixed to the lower case to surround the rail 503. Here, the rail 503 may be provided in a flattened-U shape to move a tray 501 as directed by the guide 502. Accordingly, although an external shock occurs, the rail 503 having a beam type supporter may maintain a position within the guide without being derailed from the guide 502. Despite the external shock, the rail 503 may not be derailed from the guide 502 and thus, the tray 501 may be stably moved by the rail 503.

Figure 6:
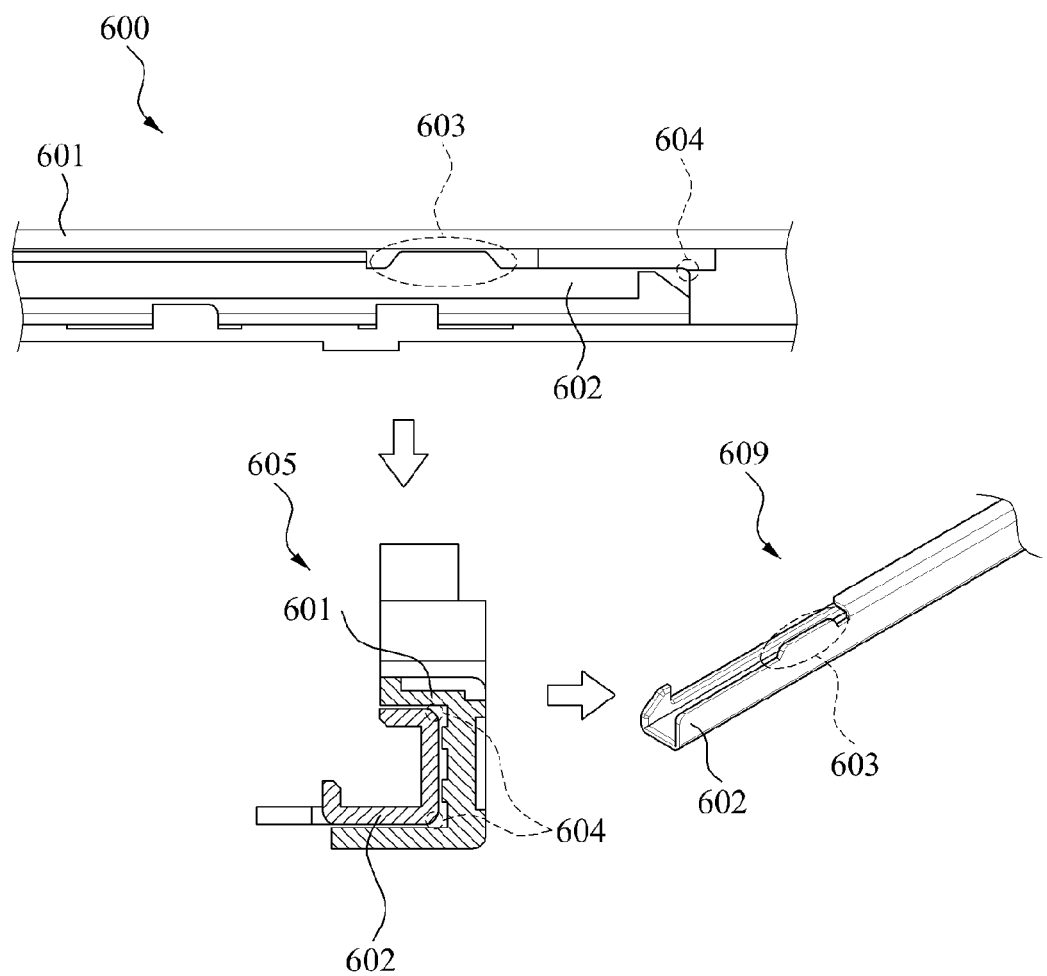
FIG. 6 is a diagram illustrating an example of a rail with a round-shaped contact portion that contacts a guide.

FIG. 6 illustrates an example of a rail 602 that has a round-shaped contact portion that contacts a guide 601.

Referring to a cross-sectional view 600 of FIG. 6, the guide 601 may be fixed to a lower case to surround the rail 602. For example, the guide 601 may be provided in a flattened-U shape or an L shape. In addition, the rail 602 may be provided in a flattened-U shape to slide and move a tray along the guide 601.

In this example, as indicated by dotted line circles 603 and 604, an edge portion of the rail 602 contacting with the guide 601 may be provided in a round shape. Accordingly, when the rail 602 moves a tray along the guide 601, a load between the rail 602 and the guide 601 is reduced. For example, friction caused by contact between the rail 602 and the guide 601 may be reduced.

Referring to a side view 605 of the rail 602 and the guide 601, the flattened-U shape rail 602 may be disposed in a flattened-U shape guide 601. In this example, as indicated by dotted line circle 604, a contact portion between an exterior side of the rail 602 and an interior side of the guide 601, more particularly, an edge of the rail 602 may be provided in a round shape. Accordingly, friction caused by contact between the rail 602 and the guide 601 may be reduced, and thus, the tray may be moved smoothly by the rail 602.

When the friction between the rail 602 and the guide 601 is reduced, the rail 602 may be derailed from the guide 601 due to an occurrence of an external shock. To avoid such a derailment, the rail 602 may have a beam type supporter in order to prevent the derailment of the rail 602 from occurring due to the external shock.

According to various aspects, the guide 601 includes a hole that receives a top protrusion of the beam-type supporter 603. For example, the hole may be in the shape of or may have a width based on the width of the beam-type supporter 603. As an example, the hole may have a closed shape, a partially open shape that slidably receives the beam-type supporter 603 therein, and any other desired shape. While the top protrusion of the beam-type supporter 603 is inserted into the hole of the guide 601, the beam-type supporter stably supports the rail to the guide 601 from at least two sides of the hole.

The hole may be positioned towards a far end of the guide 603 to correspond to the location of the beam type supporter 603. For example, the hole may be disposed on an underneath side of the interior of the guide 603, and may or may not completely pass through the entire underneath side of the guide 603.

Referring to a perspective view 609 illustrating an upper portion of the rail 602, the rail 602 may have the beam type supporter as indicated by the dotted line circle 603. In this example, a contact area between the beam type supporter and the guide 601 may be provided on a plane. Also, the beam type supporter may increase a supporting power of the rail 602 with respect to an upper portion and a lower portion of the guide 601, configured to surround the rail 602.

As described above, when the edge of the rail 602 is provided in a round shape and includes the beam type supporter, the rail 602 may reduce friction between the rail 602 and the guide 601, and may reduce a possibility of a derailment of the rail 602 from the guide 601 due to an occurrence of an external shock. In this example, despite the occurrence of the external shock, the rail 602 and the tray may constantly support the guide 601 without being derailed from the guide 601.

As described herein, a structure of a rail having a beam type supporter and a structure of the optical disc drive including the rail are described above with reference to FIG. 1 through FIG. 6. Although the foregoing examples are described based on the rail having one supporter, it is only an example and it should be appreciated that the rail may also have a plurality of supporters.

In an example in which the rail has a plurality of supporters, the plurality of the supporters may be adjusted so that a length of a contact plane between the supporters and the guide is relatively short in comparison to a case in which the rail has a single supporter. In this example, the length of contact plane and a number of supporters for increasing a supporting power of the rail with respect to the guide may be considered for determining a configuration of the plurality of supporters for the rail.

According to various aspects, it is possible to increase a supporting power of a rail with respect to a guide by preventing a tray and the rail from being derailed despite an occurrence of an external shock.

According to various aspects, it is possible to reduce friction between a rail and a guide, and prevent derailment of the rail from the guide by improving a configuration of the rail.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical disc drive, comprising:
   a tray disposed in a case of the optical disc drive;
   a guide fixed to the case; and
   a rail comprising a beam type supporter and being connected with the tray, the beam type supporter comprising a top protrusion, wherein
   while the rail is inserted into the guide, a contact portion between an exterior side of the rail and an interior side of the guide comprises a round-shape edge.

2. The optical disc drive of claim 1, wherein the beam type supporter comprises a rectangular pulse shape.

3. The drive of claim 1, wherein a contact area between the between the beam type supporter and the guide is provided on a plane.

4. The optical disc drive of claim 1, wherein a side of the beam type supporter comprises at least one of a stair shape, a curved shape, a saw toothed shape, and a tapered shape indicating a variable slope.

5. The optical disc drive of claim 1, wherein the rail moves the tray through the guide.

6. The optical disc drive of claim 5, wherein the rail comprises a flattened-U shape to move the tray through the guide.

7. The optical disc drive of claim 1, wherein the guide comprises one of a flattened-U shape and an L shape.

8. The optical disc drive of claim 1, wherein the rail is disposed on both sides of the tray.

9. The optical disc drive of claim 1, wherein a length of a contact area between the supporter and the guide is variable.

10. The optical disc drive of claim 1, wherein:
the guide comprises a hole, and
the top protrusion is inserted into the hole of the guide to support the rail with respect to the guide.

11. An optical disc drive, comprising:
a tray disposed in a case of the optical disc drive;
a guide fixed to the case; and
a rail comprising a variable slope to support the guide and a supporter including a planar contact area between the supporter and the guide, the supporter comprising a top protrusion, wherein
while the rail is inserted into the guide, a contact portion between an exterior side of the rail and an interior side of the guide comprises a round shape.

12. The optical disc drive of claim 11, wherein the rail is disposed on both sides of the tray.

13. A tray moving device to move a tray of an optical disc drive through a guide, the device comprising:
a body connected to the tray; and
a beam type supporter connected with the body, the beam type supporter comprising a top protrusion which is inserted into a hole of the guide to support the tray moving device with respect to the guide, wherein
while the beam type supporter is inserted into the guide, a contact portion between an exterior side of the tray moving device and an interior side of the guide comprises a round shape.

14. The device of claim 13, wherein the tray moving device is disposed on both sides of the tray.

15. The device of claim 13, wherein:
the guide comprises a hole, and
the top protrusion is inserted into the hole of the guide to support the beam type supporter with respect to the guide.

* * * * *